United States Patent [19]
Jang

[11] Patent Number: 5,601,118
[45] Date of Patent: Feb. 11, 1997

[54] DISCHARGE VALVE APPARATUS OF COMPRESSOR

[75] Inventor: Geun-Sik Jang, Seoul, Rep. of Korea

[73] Assignee: Samsung Electronics Co., Ltd., Rep. of Korea

[21] Appl. No.: 513,023

[22] Filed: Aug. 9, 1995

[30] Foreign Application Priority Data

Jun. 3, 1995 [KR] Rep. of Korea ............... 95-12621 U

[51] Int. Cl.$^6$ .................................................. F16K 15/14
[52] U.S. Cl. ........................................ 137/856; 137/857
[58] Field of Search ..................................... 137/856, 857

[56] References Cited

U.S. PATENT DOCUMENTS

| | | | |
|---|---|---|---|
| 4,628,963 | 12/1986 | Ishijima | 137/857 |
| 4,642,037 | 2/1987 | Fritchman | 137/856 |
| 5,099,886 | 3/1992 | Squirrell | 137/856 |
| 5,379,799 | 1/1995 | Kawai | 137/856 |

Primary Examiner—John Rivell
Attorney, Agent, or Firm—Burns, Doane, Swecker & Mathis, L.L.P.

[57] ABSTRACT

A compressor for compressing a refrigerant includes a discharge outlet, and a valve mechanism for controlling the opening and closing of the outlet. The valve mechanism comprises a reed normally biased to an outlet-closing position by a leaf spring which is yieldable under the pressure of compressed refrigerant applied to the reed to enable the reed to flex and open the outlet. A fixed valve stopper overlies the leaf spring for limiting the extent of travel of the leaf spring and reed when opening the outlet. The valve stopper includes a flat inner section spaced above the outlet by a uniform distance, and a convexly curved outer section extending from the flat section to a free end of the stopper. During a valve opening operation, an inner portion of the leaf spring collides with the flat section, but an outer free end of the leaf spring does not collide with the stopper, because of the curvature of the outer section of the stopper. Thus, potential damage to the outer end of the leaf spring is avoided.

5 Claims, 5 Drawing Sheets

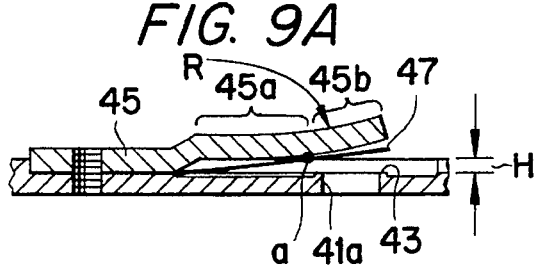
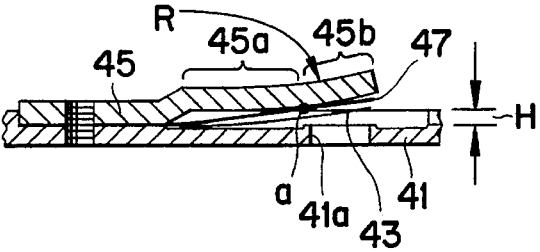
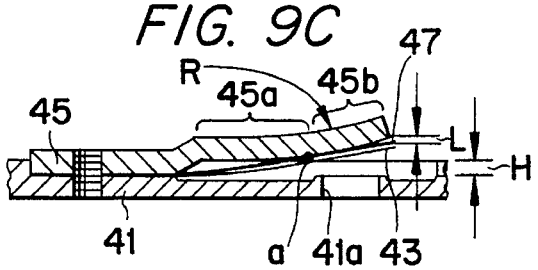
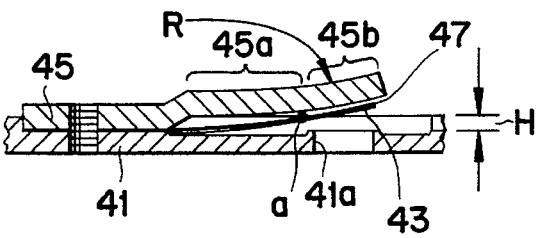
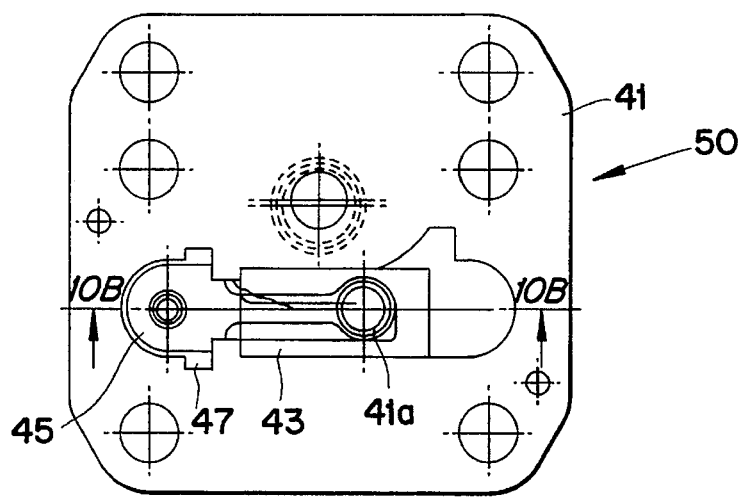
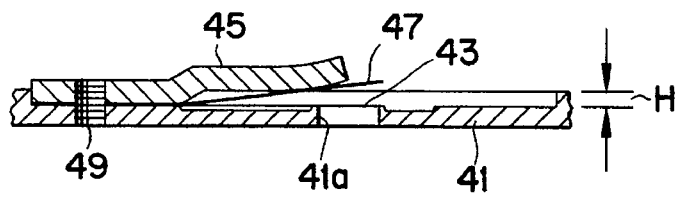

DISCHARGE VALVE APPARATUS OF COMPRESSOR

BACKGROUND OF THE INVENTION

1. Field of the Invention

The present invention relates to a compressor for an air conditioner or the like, and more particularly to a discharge valve apparatus of a compressor by which a discharge valve element thereof can be easily closed or opened to thereby improve the efficiency of the compressor, and at the same time, to increase reliability of the compressor by way of reduced danger of valve destruction.

2. Description of the Prior Art

Generally, a compressor, as illustrated in FIG. 1, includes a body 1 as an enclosure, a stator 3 disposed within the body 1 to thereby receive electric power from an outside source for the formation of a magnetic field, a rotor 5 for being rotated by the magnetic field, a rotary shaft 9 formed at one end thereof with an eccentric shaft 7 and rotated with the rotor 5, a roller member 11 mounted on the eccentric shaft 7 to perform a rotary motion and a sliding motion, an upper flange 15 fixed at an upper side of a cylinder member 13 and a lower flange 17 fixed at a lower side of the cylinder member 13.

The body 1 is provided at an upper surface thereof with a discharge pipe 19 for guiding a flow of refrigerant compressed in the cylinder member 13, and is also provided at one side thereof with a suction pipe 21 for guiding incoming refrigerant into the cylinder member 13.

The upper flange 15 has a discharge hole 15a interconnected with a discharge port 13a formed at the cylinder member 13 to thereby allow discharge of the refrigerant compressed in the cylinder member 13.

Furthermore, as illustrated in FIGS. 2A and 2B, the upper flange 15 includes a valve plate 23 formed with a discharge hole 23a aligned with the hole 15a for guiding the refrigerant compressed in the cylinder member 13. A valve stopper 27 is spaced at a predetermined height (H) above the plate 23 in order to limit the opening travel of a discharge reed disposed at an upper surface of the valve plate 23. A valve spring 29 is provided between the discharge reed 25 and the valve stopper 27 to flexibly control the discharge reed 25. A discharge valve member 20 (hereinafter referred to as a first discharge valve member) is defined by the discharge reed 25, valve spring 29 and the valve stopper 27 which are fastened to the valve plate 23 by fastening means 31.

The stator 3 creates the magnetic field when energized, and when the rotor 5 is rotated by the magnetic field the rotary shaft 9 joined to the rotor 5 is also rotated.

The eccentric shaft 7 provided on the rotary shaft 9 is rotated with the rotary shaft 9 at a high speed, and the roller member 11 thereon causes refrigerant to be sucked in through the suction pipe 21 and compressed to a high temperature and also high pressure.

When pressure in the cylinder member 13 goes up above a predetermined level, the discharge reed 25 moves to an open state shown in FIG. 3B from the FIG. 3A closed state, until an end portion of the discharge reed 25 collides with the valve stopper 27 as shown in FIG. 3C, and then assumes a bent FIG. 3D state of "S" shape.

When the discharge reed 25 is completely opened, as explained above, to thereby enable the refrigerant to be discharged, the pressure in cylinder member 13 decreases, whereupon the discharge reed 25 is closed in a reverse order of the opening process, to thereby stop the discharge of the refrigerant.

Meanwhile, the oil stored in an oil chamber 33 formed at a bottom of the compressor body is moved up to the rotary shaft 9 by an oil paddle (not shown) disposed within the rotary shaft 9 in response to rotation of the rotary shaft 9, thereby providing cooling and lubricating functions in order to reduce friction between the rotary shaft 9 and the upper and lower flanges 15 and 17, and between the rotary shaft 9, eccentric shaft 7 and the roller member 11. The oil is ejected through a plurality of oil orifices (not shown) formed around the periphery of the rotary shaft 9.

However, there is a problem in the discharge valve member 20 (the first discharge valve member) of the conventional compressor thus constructed, as illustrated in FIGS. 3A to 3D, because when the discharge reed 25 is in an open state, a tip end portion of the discharge reed 25 collides with the valve stopper 27 to generate locally a large amount of collision stress and to thereby possibly damage the apparatus including the discharge reed 25, and at the same time, to increase the closing time because a conversion must be made from the bent "S" state of the shaft to effect a closing operation.

Accordingly, in order to solve the above-mentioned problem, a conventional discharge valve member 30 (hereinafter referred to as a second discharge valve member), as illustrated in FIGS. 4A, 4B, and 5A–5C is coupled with a valve stopper 127 provided with a curved portion 27a to thereby reduce the collision stress of the discharge reed 25.

In other words, when the pressure in the cylinder member 13 reaches a predetermined level, the discharge reed 25 begins to open along the curvature of the valve stopper 127 as illustrated in FIG. 5B until completely opened as shown in FIG. 5C, and when the pressure in the cylinder member 13 goes down, the procedure is reversed to thereby close the discharge reed 25.

However, there is another problem in the second discharge valve member 30 thus constructed, because although the collision stress of the tip end portion of the discharge reed 25 can be greatly reduced, a strong stress is generated around a neck area of a relatively narrow discharge reed 25 because the discharge reed 25 must be bent along the curvature of the valve stopper 27, and it takes a lengthy period of time for the discharge reed 25 to be completely opened, and at the same time, a contact area of oil film is broadened to thereby delay a closing time of the discharge reed 25 because the discharge reed 25 is tightly contacted against the valve stopper 27 along a fairly large area.

SUMMARY OF THE INVENTION

Accordingly, the present invention has been disclosed to solve the afore-mentioned problems and it is an object of the present invention to provide a discharge valve apparatus of a compressor by which a discharge valve can be easily opened and closed to thereby increase the efficiency of the compressor, and at the same time, to prevent the valve from being concentrated with stress, so that damage to the valve is prevented and reliability thereof can be increased.

In accordance with the object of the present invention, there is provided a discharge valve apparatus of a compressor, the apparatus comprising:

valve plate formed with a discharge hole for guiding discharge of the refrigerant, a valve stopper disposed at an upper area of the valve plate to limit opening and closing domains of a discharge reed; and an elastic valve spring arranged between the discharge reed and the valve stopper to thereby prevent the discharge reed from being delayed in closing and to reduce noisy vibration, wherein the valve stopper comprises;

a flat unit formed with a uniform height to limit opening and closing domains of the discharge reed; and a curved unit extensively formed from the flat unit to thereby possess a contact for contacting the valve spring, and formed with a predetermined radius of curvature for maintaining a predetermined interval so that a collision can be prevented when the valve spring and the discharge reed are fully opened.

BRIEF DESCRIPTION OF THE DRAWINGS

For a better understanding of the nature and objects of the invention, reference should be made to the following detailed description taken in conjunction with the accompanying drawings in which:

FIGS. 9A–9D are views similar to FIG. 6B showing various stages of an opening procedure performed by the valve assembly depicted in FIG. 6A;

FIG. 10A is a plan view of a second embodiment of a valve assembly according to the present invention; and FIG. 10B is a sectional view taken along line 10B—10B in FIG. 10A.

DETAILED DESCRIPTION OF PREFERRED EMBODIMENTS OF THE INVENTION

Figure 1:
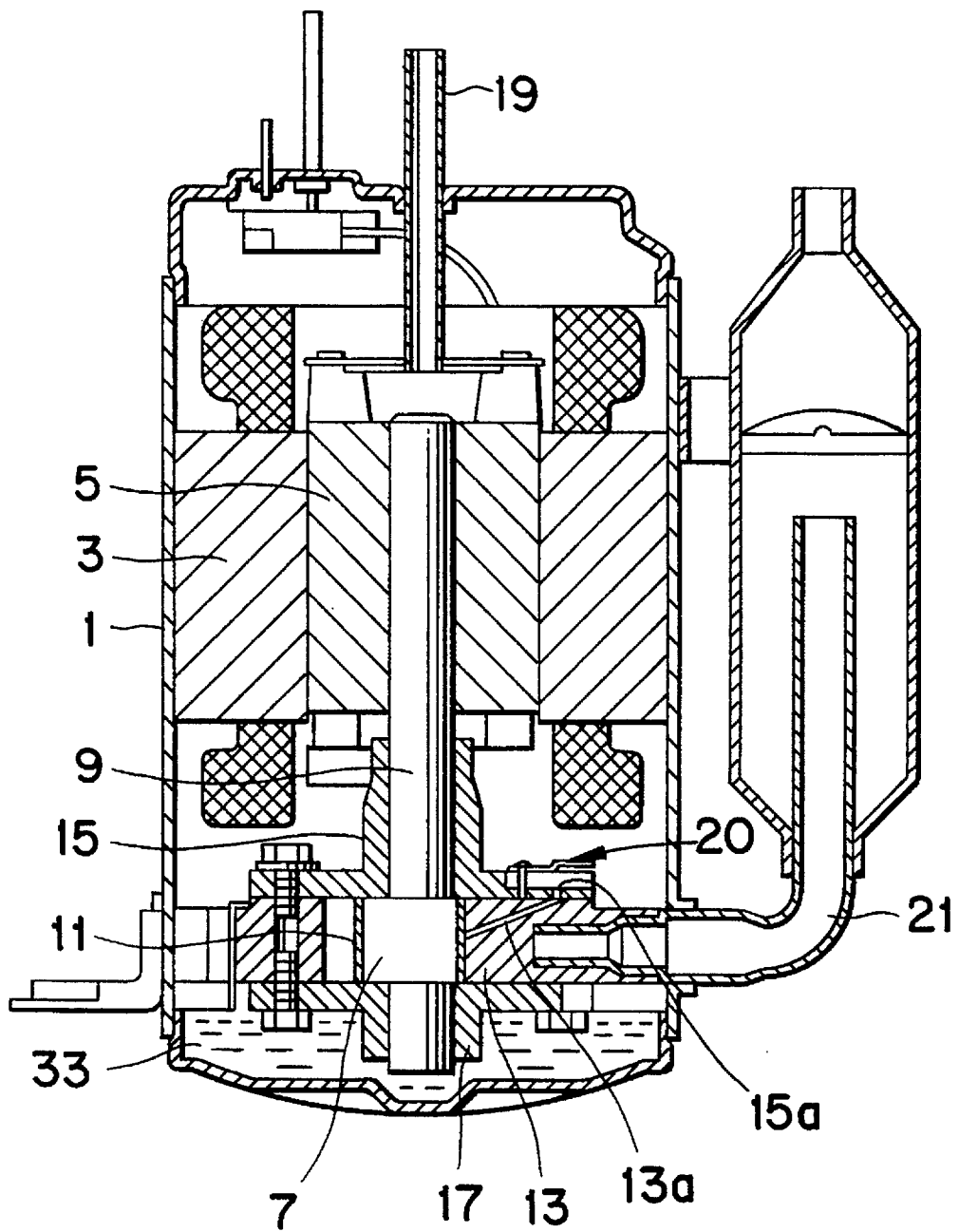
FIG. 1 is a longitudinal sectional view for showing a schematic construction of a conventional compressor.
Figure 2A:
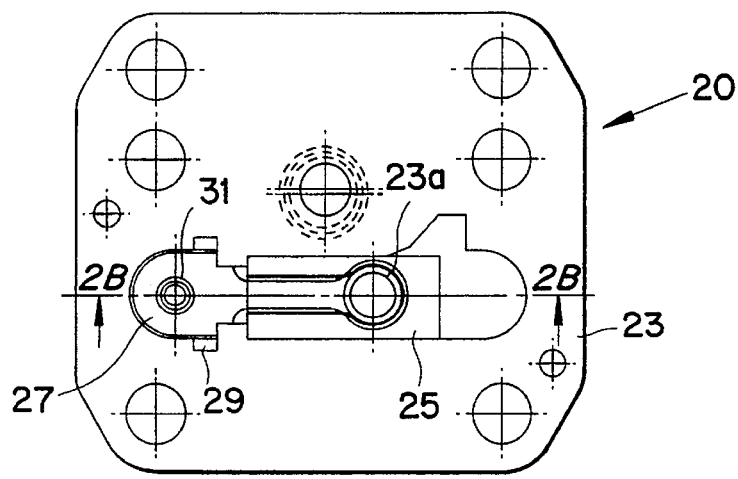
FIG. 2A is a plan view of a valve assembly used in the compressor of FIG. 1.
Figure 2B:
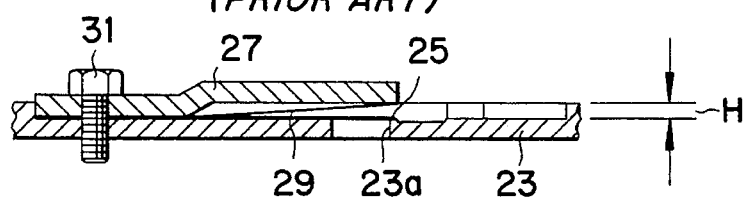
FIG. 2B is a sectional view taken along line 2B—2B in FIG. 2A.
Figure 3A:
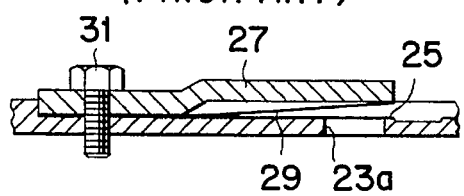
FIGS. 3A–3D are views similar to FIG. 2B depicting various stages of a hole-opening procedure performed by the valve assembly of FIG. 2A.
Figure 3B:
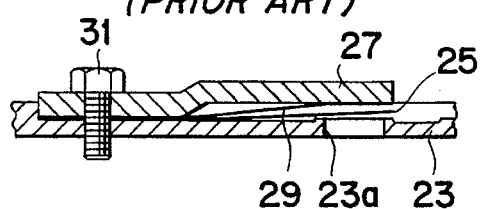
Figure 3C:
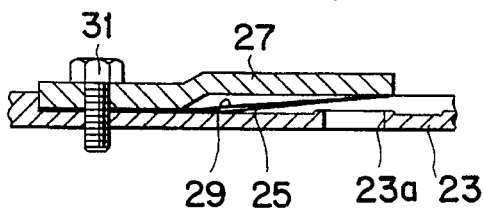
Figure 3D:
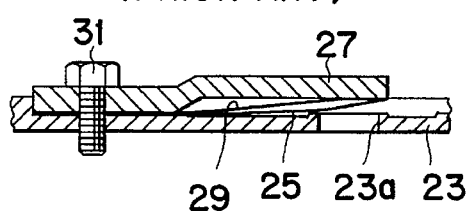
Figure 4A:
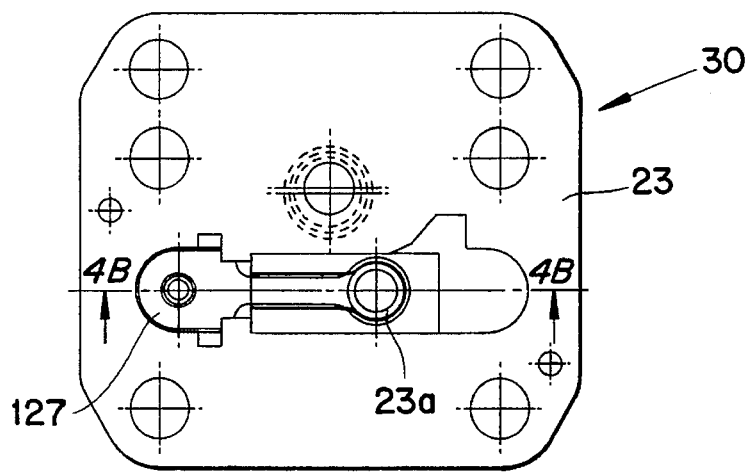
FIG. 4A is a plan view of a modified conventional valve assembly.
Figure 4B:
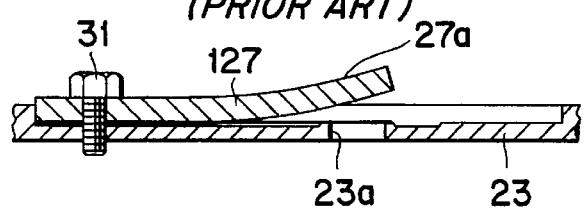
FIG. 4B is a sectional view taken along line 4B—4B of FIG. 4A.
Figure 5A:
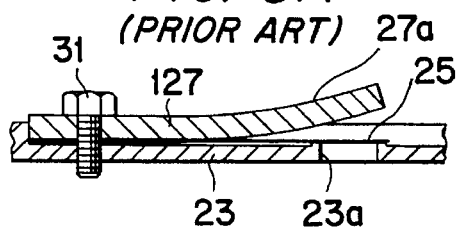
FIGS. 5A–5C are schematic views illustrating stages occurring during the opening of the valve assembly depicted in FIG. 4A.
Figure 5B:
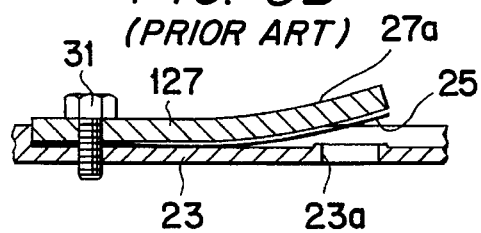
Figure 5C:
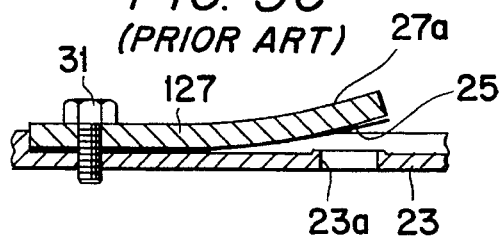

An embodiment of the present invention will now be described in detail with reference to FIGS. 6, 7, 8 and 9.

Throughout the drawings, like reference numerals are used for designation of like or equivalent parts in FIGS. 1 through 5 for simplicity of illustration and explanation. Redundant descriptions are also omitted.

Figure 6A:
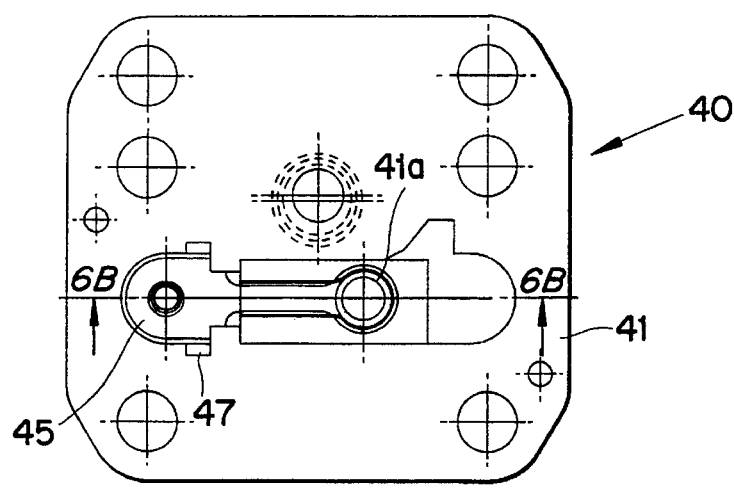
FIG. 6A is a plan view of a discharge valve assembly according to a first embodiment of the present invention.
Figure 6B:
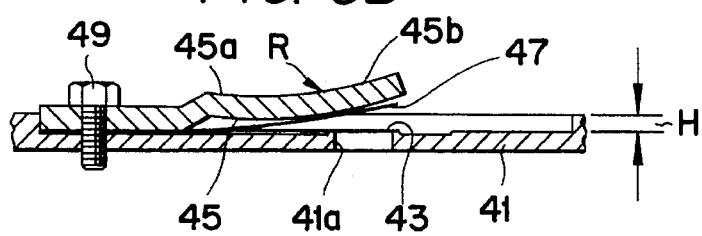
FIG. 6B is a sectional view taken along line 6B—6B in FIG. 6A.

As illustrated in FIGS. 6A, 6B, the discharge valve apparatus of a compressor comprises a valve plate 41 having a discharge hole 41a interconnected with the discharge port 13a of the cylinder member 13 so that the refrigerant compressed in the cylinder member 13 can be discharged therethrough. A valve stopper 45 includes a flat section 45a spaced above the plate 41 by a uniform height H to limit the opening travel of the discharge reed, and a convexly curved section 45b extending from the flat section 45a with a predetermined radius of curvature dimensioned so that collision with the valve spring 7 is prevented. A resilient valve spring 47 is interposed between the discharge reed 43 and the valve stopper 45. In accordance with the invention, a closing delay of the discharge reed 43 can be prevented and noisy vibration can be reduced. The discharge reed 43, valve spring 47 and the valve stopper 45 are tightly secured by fastening means 49 to the valve plate 41. Thus, a surface of the valve stopper 45 which faces the plate 41 extends from an inner anchored end 45c to an outer free end 45d of the stopper 45 and includes a flat inner section 45e and a convexly curved outer section 45f. The flat inner section 45e is spaced from the plate 41 by a uniform distance, and the distance between the convexly curved outer section 45f gradually increases toward the free end 45d.

Figure 7A:
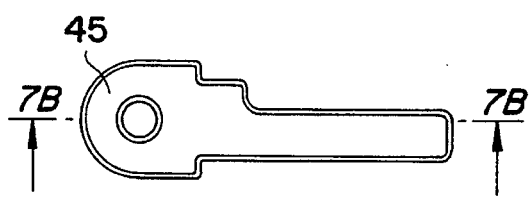
FIG. 7A is a plan view of a valve stopper according to the present invention.
Figure 7B:
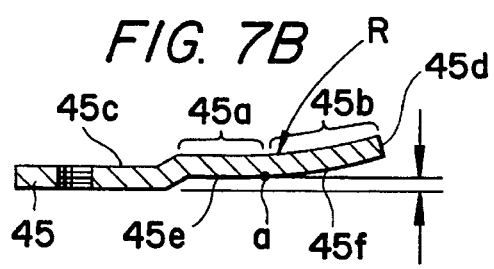
FIG. 7B is a sectional view taken along the line 7B—7B in FIG. 7A.

The valve stopper 45 is formed asymmetrically lengthwise around a center line CL of the curved section 45b so that a passage of the refrigerant discharge can be smoothly formed (see FIGS. 7A, 7B).

The curved section 45b of the valve stopper 45 is made to have a predetermined radius of curvature R so that a tip end portion 47a of the valve spring 47 and the discharge reed 43 can maintain a predetermined spacing L from the valve stopper 45 even in the complete opening state of the discharge reed 43. (see FIGS. 9A to 9D).

Figure 8A:
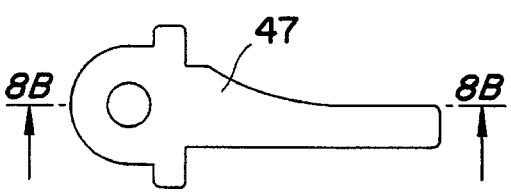
FIG. 8A is a plan view of a leaf spring according to the present invention.
Figure 8B:
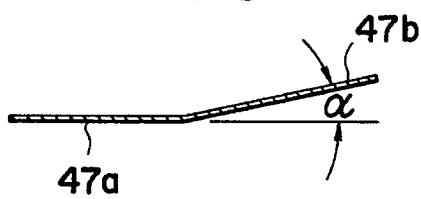
FIG. 8B is a sectional view taken along line 8B—8B in FIG. 8A.

The valve spring 47 has a similar shape as the valve stopper 45 (see FIGS. 7A and 8A) and is formed asymmetrically lengthwise around the center line thereof, and includes a flattened section 47a and an inclined section 47b inclined at a predetermined angle of α degrees, as illustrated in FIGS. 8A, 8B.

Next, the operation of the discharge valve apparatus according to the first embodiment of the present invention will be described.

First of all, when the compression is processed in the cylinder member to thereby reach a predetermined pressure level therein, the discharge reed 43 begins to be opened, as illustrated in FIG. 9A, to thereby be located between the valve spring 47 and the discharge hole 41a (see FIG. 9B), and then, the discharge reed 43 continues to be opened so that a tip end portion of the discharge reed 43 collides with a tip end portion of the valve spring 47. (see FIG. 9C)

The discharge reed 43 is in an open state continuously, in contrast to the valve spring 47. (see FIG. 9D)

At this time, the curved section 47b of the valve spring 47 makes initial contact with a point (a) of the valve stopper 45, so that, the valve spring 47 uses the point (a) as a hinge or fulcrum to thereby have a strong resilient restoring power and there can be hardly any displacement.

In other words, a predetermined space (L) is maintained between the valve spring 47 and the valve stopper 45 in a complete opening state, thereby preventing the tip end portion of the valve spring from colliding with the valve stopper 45.

When the refrigerant discharge is completed, the closing process is performed by a reverse order of the opening steps. In other words, the valve spring 47, and the discharge reed 43 in contact with the valve spring 47 descend toward the discharge hole 41a whereby the inclined section 47b of the valve spring 47 assumes the predetermined angle α, and the discharge reed 43 becomes situated between the discharge hole 41a and the valve spring 47. (see FIG. 9B)

Then, the discharge reed 43 continues the closing process to completely close the discharge hole 41a. (see FIG. 9A)

Since the inclined section 47b of the valve spring 47 is fulcrumed about the point (a) it has a strong restoring force. So, once the pressure in the cylinder descends to a predetermined level, the valve spring 47 can be lowered very fast because of the restoring force.

In the above description, the construction where the valve stopper 45 overlies the complete length of the discharge reed 43 is not to be taken as limiting. Instead, the valve stopper 45 can be constructed to have a shorter length than the valve spring 47, to thereby reduce a loss of discharged refrigerant, as illustrated in FIGS. 10A, 10B.

As apparent from the foregoing, the discharge valve apparatus of a compressor according to the present invention enables the discharge valve to smoothly be opened and closed to thereby cause the refrigerant to be efficiently discharged, and at the same time, to reduce a colliding stress applied to the discharge reed, so that the valve apparatus can be prevented from being damaged and reliability of the compressor can be improved.

I claim:

1. In a compressor for compressing refrigerant, and discharging the compressed refrigerant through a discharge hole formed in a plate of the compressor and controlled by a discharge valve apparatus, the discharge valve apparatus comprising:

a reed normally assuming a closed state closing said discharge hole, and being yieldable against compressed refrigerant of a predetermined pressure;

an elastic spring overlying said reed for imposing a restoring force to said reed, said spring including an inner anchored end, and a movable portion extending outwardly from said anchored end, and terminating at a free end of said spring; and a valve stopper overlying said spring for limiting the extent of travel of said reed and movable spring portion in a hole-opening direction, said valve stopper comprising:

and inner anchored end, an outer free end, and a surface extending outwardly from said anchored end to said free end of said stopper, said surface facing said plate and disposed at a distance therefrom, an outer section of said surface arranged to overlie said hole, said surface configured to be contacted by a portion of said spring disposed between said anchored and free ends of said spring, said contact occurring at a location on said surface between said anchored and free ends of said stopper, said outer section of said surface being convexly curved such that a distance between said outer section and said hole gradually increases toward said free end of said stopper to maintain a spacing between said outer section and a free end of said spring during opening of said hole, an inner section of said surface extending from said anchored end of said stopper to said contact location being recessed away from said plate sufficiently to avoid being contacted by said spring during opening of said hole, said inner section being flat and spaced from said plate by a uniform distance to limit the opening travel of the discharge reed.

2. The compressor according to claim 1 wherein said spring is a leaf spring.

3. The compressor according to claim 2 wherein said valve stopper has a shorter length than said leaf spring.

4. The compressor according to claim 1 wherein said stopper is configured asymmetrically with respect to a center line thereof as viewed in a direction perpendicular to said stopper.

5. The compressor according to claim 4 wherein said spring is a leaf spring which is configured asymmetrically with respect to a center line thereof as viewed in a direction perpendicular to said leaf spring.

* * * * *